United States Patent
Asakura (10) Patent No.: US 11,161,522 B2
(45) Date of Patent: Nov. 2, 2021

(54) VEHICLE DISPLAY DEVICE

(71) Applicant: Yazaki Corporation, Tokyo (JP)

(72) Inventor: Junichi Asakura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 337 days.

(21) Appl. No.: 16/442,668

(22) Filed: Jun. 17, 2019

(65) Prior Publication Data
US 2019/0389481 A1    Dec. 26, 2019

(30) Foreign Application Priority Data
Jun. 25, 2018  (JP) .............................. JP2018-119503

(51) Int. Cl.
*B60W 50/04* (2006.01)
*B60K 35/00* (2006.01)

(52) U.S. Cl.
CPC ........... *B60W 50/045* (2013.01); *B60K 35/00* (2013.01); *B60K 2370/1868* (2019.05)

(58) Field of Classification Search
None
See application file for complete search history.

(56) References Cited

U.S. PATENT DOCUMENTS

| | | | | |
|---|---|---|---|---|
| 2008/0161998 A1* | 7/2008 | Yokoi | ................... | G07C 5/0841 701/36 |
| 2020/0221057 A1* | 7/2020 | Shimoda | ................ | B60K 35/00 |

FOREIGN PATENT DOCUMENTS

| | | | | |
|---|---|---|---|---|
| CN | 104749807 A | * | 7/2015 | ........... G09G 3/3406 |
| DE | 19842429 A1 | * | 3/2000 | ................ H02J 1/14 |
| DE | 10125818 A1 | * | 11/2002 | ............ B60W 50/00 |
| DE | 102012204154 A1 | | 9/2013 | |
| EP | 3184348 A2 | * | 6/2017 | ............. B60K 35/00 |
| JP | 2009234578 A | * | 10/2009 | |
| JP | 2016-45244 A | | 4/2016 | |
| JP | 2016-62095 A | | 4/2016 | |
| JP | 2017-032543 A | | 2/2017 | |
| JP | 2018-105993 A | | 7/2018 | |
| JP | 2019-108071 A | | 7/2019 | |
| JP | 2019108071 A | * | 7/2019 | |
| WO | 2016/027705 A1 | | 2/2016 | |
| WO | WO-2017199780 A1 | * | 11/2017 | ............. B60K 35/00 |

OTHER PUBLICATIONS

Anonymous, "Throttling—Wikipedia", Nov. 27, 2015, Retrieved from the Internet: URL:https://de.wikipedia.org/wiki/Throttling [retrieved on Oct. 11, 2019] 2 pages total.

* cited by examiner

*Primary Examiner* — Kelly D Williams
(74) *Attorney, Agent, or Firm* — Sughrue Mion, PLLC (57) ABSTRACT

A vehicle display device includes a display unit that displays at least an image relating to a driving state of a vehicle, a controller that generates image data of an image to be displayed on the display unit, and a temperature sensor that measures a temperature of the controller. The controller has a function of performing a first processing other than generating image data relating to the driving state. When the temperature of the controller is equal to or higher than a predetermined first value, the controller generates the image data relating to the driving state while reducing an amount of first processing performed by the controller.

4 Claims, 5 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2018-119503 filed in Japan on Jun. 25, 2018.

BACKGROUND OF THE INVENTION

1. Field of the Invention

The present invention relates to a vehicle display device.

2. Description of the Related Art

More and more vehicles have been equipped with self-driving capabilities and electrified vehicle technologies. In accordance with such developments, a wider variety of electronic devices have been mounted on vehicles. Electronic devices mounted on a vehicle are controlled by controllers such as electronic control units (ECUs) provided for the respective electronic devices.

For example, Japanese Patent Application Laid-open No. 2017-032543 discloses a technique relating to a drive assistance device including an operating signal input unit and a command output unit. The operating signal input unit receives an operating signal from a user. The command output unit outputs, upon reception of the operating signal, a self-driving control command corresponding to the content displayed in a signpost object to a self-driving controller that controls self-driving functionality. According to Japanese Patent Application Laid-open No. 2017-032543, this drive assistance device enables the driver to give a certain driving instruction intuitively and easily to the vehicle.

When it comes to a vehicle display device, a controller configured to control electronic devices such as a display unit generates more heat as the controller performs more processing. In this regard, a vehicle display device that displays an image relating to a driving state of a vehicle while preventing a further increase in temperature of the controller is desired.

SUMMARY OF THE INVENTION

It is an object of the present invention to provide a vehicle display device that can display an image relating to a driving state of a vehicle while preventing an increase in temperature of a controller.

In order to achieve the above mentioned object, a vehicle display device according to one aspect of the present invention includes a display unit configured to display at least an image relating to a driving state of a vehicle; a controller configured to generate image data of an image to be displayed on the display unit; and a temperature sensor configured to measure a temperature of the controller, wherein the controller has a function of performing a first processing that is a processing other than generating image data relating to the driving state, and when the temperature of the controller is equal to or higher than a predetermined first value, the controller generates the image data relating to the driving state while reducing an amount of the first processing performed by the controller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes a vehicle display device according to an embodiment of the present invention with reference to the accompanying drawings. The embodiment is not intended to limit the scope of the present invention. The components of the embodiment below include those that can be easily thought of by the skilled person or those that are substantially the same.

Embodiment

Figure 1:
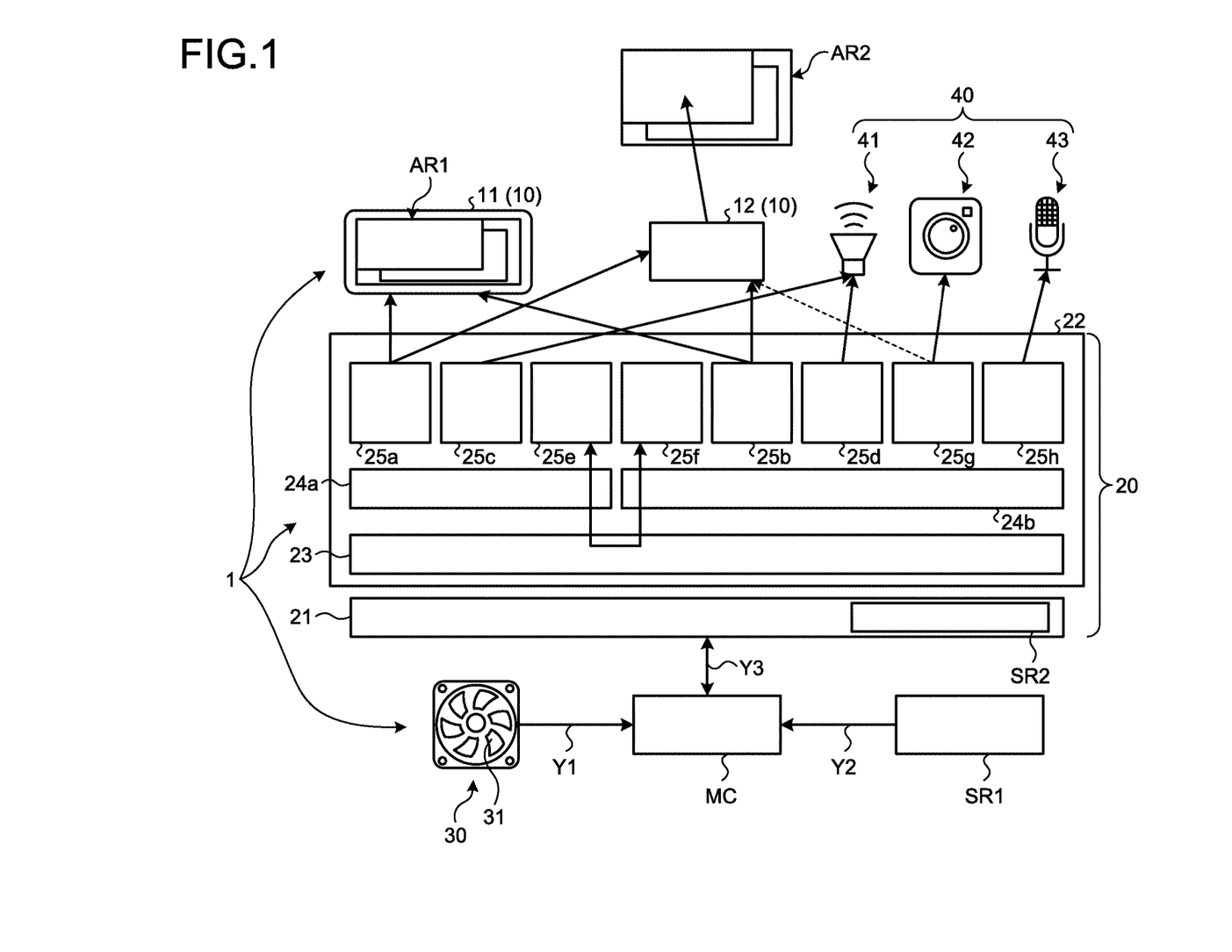
FIG. 1 is a conceptual diagram of a vehicle display device according to an embodiment of the present invention.
Figure 2:
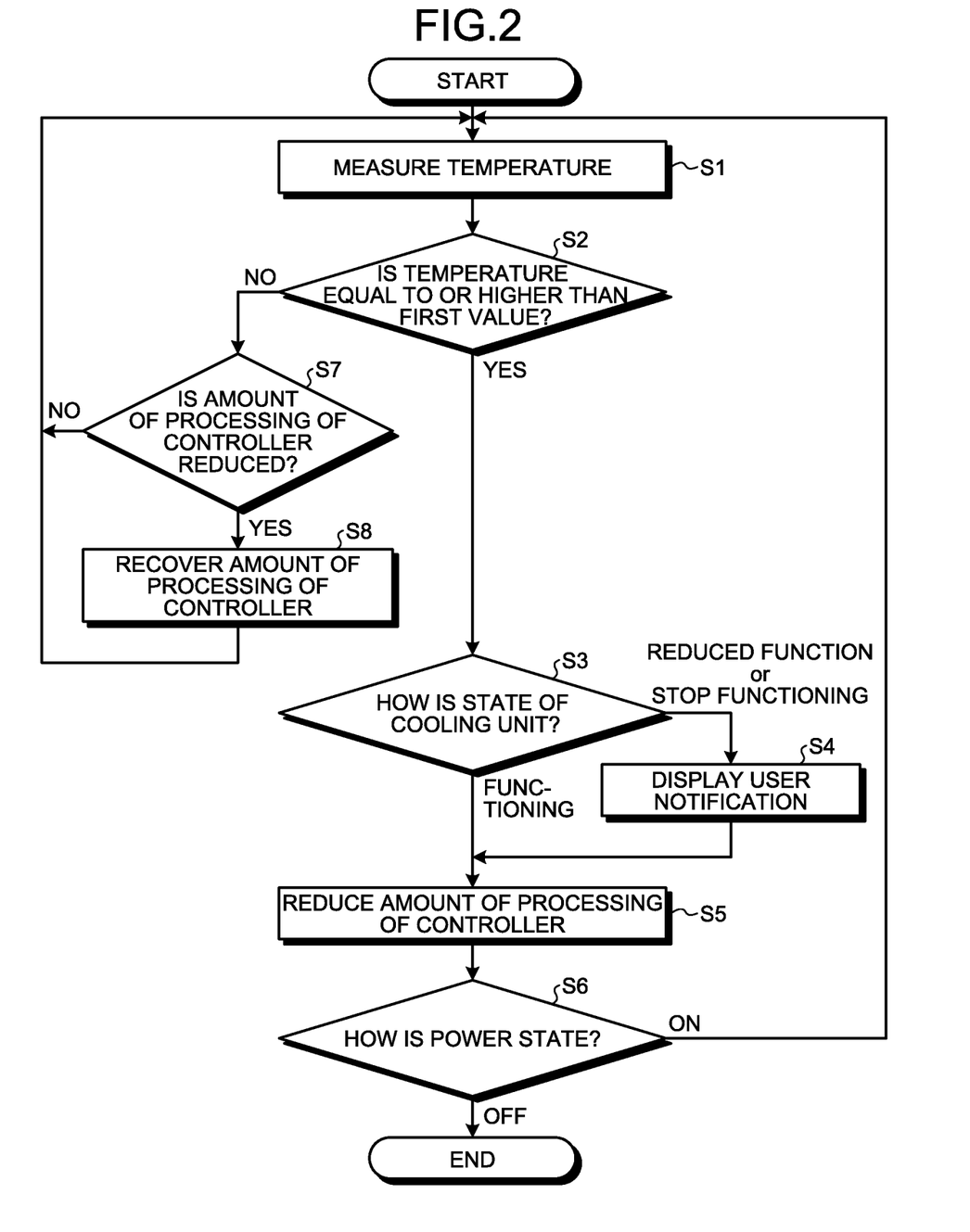
FIG. 2 is a flowchart illustrating a method of controlling the vehicle display device according to the embodiment.
Figure 3:
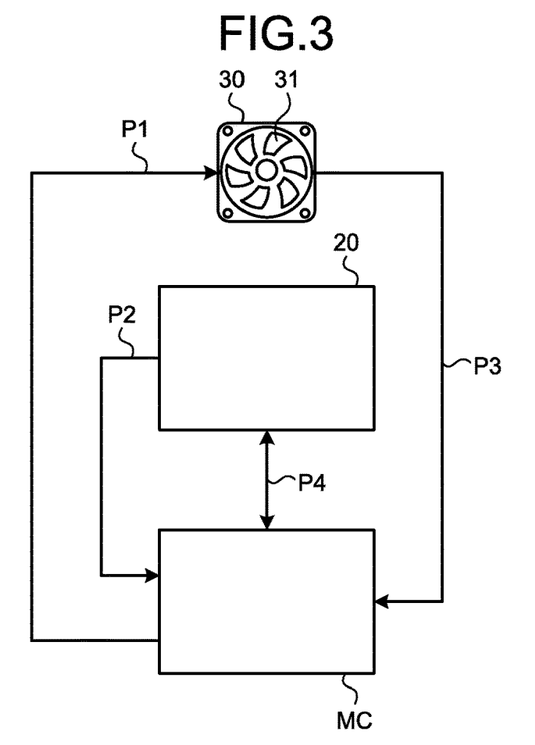
FIG. 3 is a conceptual diagram illustrating a method of controlling a cooling unit according to the embodiment.
Figure 4:
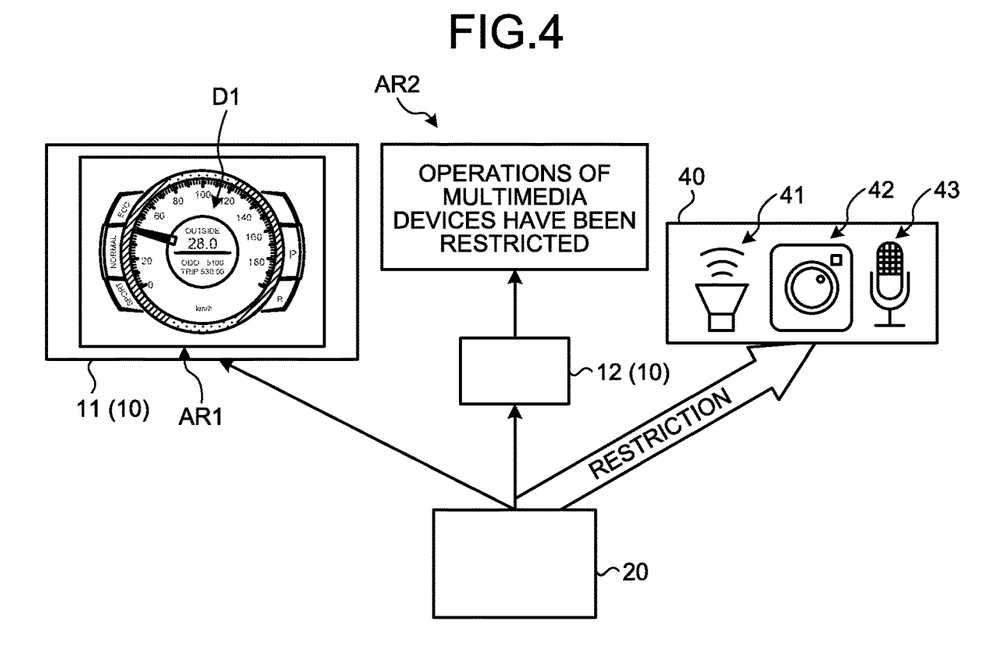
FIG. 4 is a conceptual diagram illustrating an operation of a controller according to the embodiment.
Figure 5:
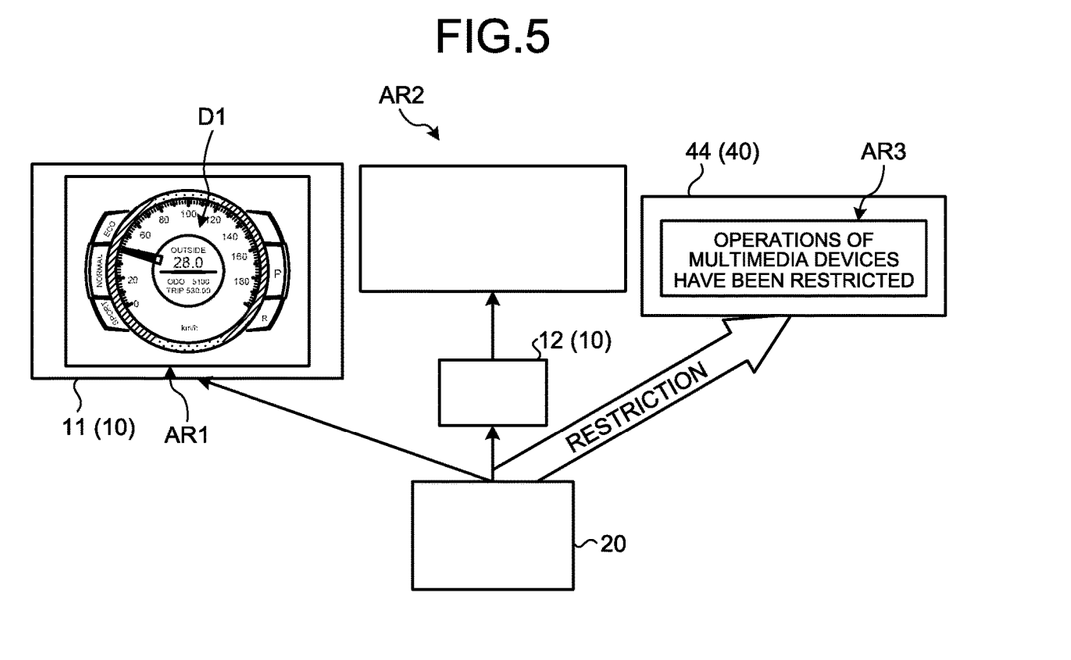
FIG. 5 is a conceptual diagram illustrating another example of the operation of the controller according to the embodiment.

An embodiment of the present invention will be described with reference to FIGS. 1 to 5. The embodiment relates to a vehicle display device. FIG. 1 is a conceptual diagram of the vehicle display device according to the embodiment. FIG. 2 is a flowchart illustrating a method of controlling the vehicle display device according to the embodiment. FIG. 3 is a conceptual diagram illustrating a method of controlling a cooling unit according to the embodiment. FIG. 4 is a conceptual diagram illustrating an operation of a controller according to the embodiment. FIG. 5 is a conceptual diagram illustrating another example of the operation of the controller according to the embodiment.

This vehicle display device 1 according to the embodiment is mounted on a vehicle such as an automobile and configured to display an image in front of the driver of the vehicle. As illustrated in FIG. 1, the vehicle display device 1 according to the embodiment includes a display unit 10, a controller 20, and a temperature sensor SR2. In the present embodiment, the display unit 10 includes a meter unit 11 and a head-up display device 12. The meter unit 11 has a first display area AR1 for displaying an image. The head-up display device 12 displays an image on a second display area AR2 such as a reflective member in front of the driver. The controller 20 controls the display unit 10 and multimedia devices 40 mounted on the vehicle. In other words, the single controller 20 of the vehicle display device 1 according to the present embodiment controls a plurality of devices. The controller 20 according to the embodiment is disposed in the meter unit 11. The temperature sensor SR2 measures the temperature of the controller 20.

The multimedia devices 40 mounted on the vehicle are an audio device 41, an image-capture device 42, and a sound input device 43. The audio device 41 outputs voice information and sound information. The audio device 41 according to the embodiment includes a speaker. The image-capture device 42 captures images outside the vehicle and inside the vehicle cabin. The image-capture device 42 according to the embodiment is a camera. The sound input device 43 receives a voice of a passenger or a sound in the vehicle. The sound input device 43 according to the embodiment is, for example, a microphone.

The controller 20 according to the embodiment is an electronic control unit (ECU). The controller 20 includes a processor 21 and a storage unit 22. The processor 21 according to the embodiment is a system-on-a-chip (SoC). The processor 21 according to the embodiment includes, for example, a central processing unit (CPU), a graphics processing unit (GPU), a memory, and a chipset. The storage unit 22 is, for example, a hard disk drive.

The controller 20 performs processing of generating image data relating to a driving state of the vehicle and performs first processing. The first processing is processing other than the processing of generating the image data relating to the driving state. The first processing includes, for example, at least one of processing relating to control of the multimedia devices 40 and processing of generating image data different from the image data relating to the driving state. In the present embodiment, the first processing includes the processing relating to control of the multimedia devices 40.

The processor 21 executes various computer programs and applications stored in the storage unit 22. The processor 21 executes the computer programs and applications to output output signals to relevant units and performs various types of processing to implement the respective functions. In the present embodiment, the processor 21 performs the processing of generating image data relating to the driving state and the first processing.

The storage unit 22 stores therein a hypervisor 23, a plurality of operating systems (OS), and a plurality of applications. In the present embodiment, the storage unit 22 stores therein the hypervisor 23, a first operating system 24a, a second operating system 24b, a first drawing application 25a, a second drawing application 25b, a first audio application 25c, a second audio application 25d, a first communication application 25e, a second communication application 25f, a camera application 25g, and a sound input application 25h.

In the present embodiment, the hypervisor 23, the first operating system 24a, and the second operating system 24b are configured such that the hypervisor 23 provides a hypervisor-type virtual platform on which two operating systems (first operating system 24a and second operating system 24b) run.

The hypervisor 23 allocates the processing of the processor 21 to the respective operating systems (first operating system 24a and second operating system 24b). In the present embodiment, the processing of generating image data relating to the driving state is performed on the first operating system 24a and the first processing is performed on the second operating system 24b.

The first drawing application 25a, the first audio application 25c, and the first communication application 25e run on the first operating system 24a. The second drawing application 25b, the second audio application 25d, the second communication application 25f, the camera application 25g, and the sound input application 25h run on the second operating system 24b.

The first communication application 25e allows for communication between the first operating system 24a and the processor 21. The second communication application 25f allows for communication between the second operating system 24b and the processor 21. The hypervisor 23 allocates the processing of the processor 21 to the respective operating systems via the first communication application 25e and the second communication application 25f.

The first drawing application 25a is designed to display an image relating to a driving state of the vehicle. The controller 20 runs the first drawing application 25a on the first operating system 24a and the processor 21 performs processing of generating image data relating to the driving state. By running the first drawing application 25a, the controller 20 controls at least one of the meter unit 11 and the head-up display device 12 to display an image relating to the driving state of the vehicle. The image relating to the driving state of the vehicle illustrates, for example, the vehicle speed, output revolutions, total drive distance, temperature of cooling water, amount of fuel in the fuel tank, remaining battery capacity, various warning lights (so called tell-tales), turn indicators, and shift position indicator. The image relating to the driving state of the vehicle includes at least an indication obligated to display in the country or region in which the vehicle drives. The first audio application 25c controls the audio device 41 such as a speaker mounted on the vehicle.

The first audio application 25c is designed to output sound corresponding to a displayed image relating to the driving state of the vehicle. The controller 20 runs the first audio application 25c on the first operating system 24a and the processor 21 generates sound data of a sound corresponding to the displayed image relating to the driving state of the vehicle. By running the first audio application 25c, the controller 20 outputs, for example, sound data of a warning sound to the audio device 41 when an image of a warning light is displayed.

The second drawing application 25b is designed to display image data different from the image data relating to the driving state. The controller 20 runs the second drawing application 25b on the second operating system 24b and the processor 21 generates image data different from the image data relating to the driving state. By running the second drawing application 25b, the controller 20 controls at least one of the meter unit 11 and the head-up display device 12 to display, for example, multimedia information such as navigation information, a video outside the vehicle, an entertainment video, or audio information.

The second audio application 25d is designed to output sound corresponding to, for example, the navigation information, the entertainment video, or the audio information. The controller 20 runs the second audio application 25d on the second operating system 24b and the processor 21 generates sound data corresponding to information such as the navigation information, the entertainment video, or the audio information. By running the second audio application 25d, the controller 20 controls the audio device 41 to output sound corresponding to, for example, information such as the navigation information, the video outside the vehicle, the entertainment video, or the audio information.

The camera application 25g is designed to cause the image-capture device 42 to capture an image of a target object. The controller 20 runs the camera application 25g and controls the image-capture device 42 to capture an image of the target object. The captured data obtained by capturing an image of a target object is generated by the processor 21 as image data. The controller 20 outputs the image data generated based on the captured data to the display unit 10 via the second drawing application 25b. The display unit 10 displays an image based on the image data.

The sound input application 25h is designed to acquire a sound inside the vehicle (e.g., voice of a passenger) as sound data. The controller 20 controls the sound input device 43 by the sound input application 25h to acquire a sound inside the vehicle. The processor 21 processes the acquired sound as sound data. For example, the controller 20 performs processing based on the sound data.

The processor 21 performs control processing and calculation processing to execute the computer programs and applications stored in the storage unit 22. Performing such processing, in some cases, generates heat in the processor 21 and the storage unit 22.

When the temperature of the controller 20 is equal to or higher than a predetermined first value, the controller 20 generates image data relating to the driving state while reducing the amount of processing of the controller 20. The controller 20 according to the embodiment generates image data relating to the driving state while reducing the amount of first processing performed by the controller 20 when the temperature of the controller 20 is equal to or higher than the predetermined first value. This configuration allows the controller 20 to display image data relating to the driving state on the display unit 10 while preventing a further increase in temperature of the controller 20. The first value is, for example, a temperature value preset in the controller 20. The first value according to the embodiment is the highest value of the normal operating temperatures of the controller 20.

The vehicle display device 1 according to the embodiment includes a cooling unit 30. The cooling unit 30 cools the controller 20 to regulate the temperature of the processor 21 and the storage unit 22. The cooling unit 30 according to the embodiment includes a blower fan 31 for cooling the controller 20.

The state (operating state) of the cooling unit 30 is monitored by a controller area network (CAN) microcomputer MC mounted on the vehicle. As indicated by arrow Y1 in FIG. 1, for example, the CAN microcomputer MC acquires data on the rotation rate of the blower fan 31 in the cooling unit 30 to monitor the state of the cooling unit 30.

The vehicle according to the embodiment is equipped with an outdoor temperature sensor SR1. The outdoor temperature sensor SR1 measures the temperature outside the vehicle. As indicated by arrow Y2 in FIG. 1, the CAN microcomputer MC acquires outdoor temperature information measured by the outdoor temperature sensor SR1. As indicated by arrow Y3 in FIG. 1, the CAN microcomputer MC and the processor 21 communicate information such as monitor information on the operating state of the cooling unit 30, outdoor temperature information, and the temperature of the processor 21. The CAN microcomputer MC controls, for example, the rotation rate of the blower fan 31 based on the outdoor temperature acquired by the outdoor temperature sensor SR1 and the temperature of the processor 21 acquired by the temperature sensor SR2.

Described next is a method of controlling the vehicle display device according to the embodiment. As illustrated in FIG. 2, the controller 20 (see FIG. 1) measures the temperature of the controller 20 by using the temperature sensor SR2 (see FIG. 1) (S1). The controller 20 acquires temperature data measured by the temperature sensor SR2. The controller 20 determines, based on the acquired temperature data, whether the temperature of the controller 20 is equal to or higher than a predetermined first value (S2). As indicated by arrow P4 in FIG. 3, the CAN microcomputer MC may acquire temperature data of the controller 20 by measuring the voltage of a thermistor provided in the controller 20. The temperature data acquired by the CAN microcomputer MC is transmitted to the controller 20 as indicated by arrow P4 in FIG. 3.

If the temperature of the controller 20 is lower than the first value, the controller 20 determines whether the amount of processing of the controller 20 is reduced (S7). If the amount of processing of the controller 20 is not reduced, the controller 20 returns the process and measures the temperature of the controller 20 again using the temperature sensor SR2 (S1). On the other hand, if the temperature of the controller 20 is equal to or higher than the first value, the controller 20 determines the state of the cooling unit 30 (S3). The controller 20 acquires monitor information on the operating state of the cooling unit 30 through the CAN microcomputer MC.

As indicated by arrow P1 in FIG. 3, the CAN microcomputer MC outputs a pulse-width modulated (PWM) signal to the cooling unit 30. The cooling unit 30 drives the blower fan 31 at a rotation rate based on the PWM signal output from the CAN microcomputer MC. In other words, the cooling unit 30 is controlled by the CAN microcomputer MC in a PWM manner. The CAN microcomputer MC detects the rotation pulse of the blower fan 31 as indicated by arrow P3 in FIG. 3. The CAN microcomputer MC compares the PWM signal output to the cooling unit 30 with the rotation pulse of the blower fan 31 to determine the operating state of the cooling unit 30. In other words, the CAN microcomputer MC determines whether the cooling function of the cooling unit 30 is operating normally. In the present embodiment, the cooling function of the cooling unit 30 is operating normally when, for example, the blower fan 31 is rotating at a predetermined rotation rate corresponding to the temperature of the processor 21. If the cooling function of the cooling unit 30 is reduced or stopped, the CAN microcomputer MC informs, as indicated by arrow P2 in FIG. 3, the controller 20 that the function of the cooling unit 30 has been reduced or stopped.

If the cooling function of the cooling unit 30 has been reduced or stopped, the controller 20 displays a user notification on the display unit 10 (S4). In the present embodiment, the user notification is displayed on at least one of the first display area AR1 of the meter unit 11 and the second display area AR2 of the head-up display device 12. In the present embodiment, the controller 20 displays a notification indicating reduction or stopping of the cooling function of the cooling unit 30 as the user notification.

The controller 20 displays the user notification on the display unit 10 and then reduces the amount of processing of the controller 20 (S5). If the cooling unit 30 is operating normally, the controller 20 also reduces the amount of processing of the controller 20 (S5). The controller 20 generates image data relating to the driving state while reducing the amount of processing of the controller 20. The generated image data is displayed on the display unit 10.

Reducing the amount of processing performed by the controller 20 can reduce the amount of heat generated in the controller 20. The controller 20, therefore, can display important indicators such as the vehicle speed, output revolutions, total drive distance, temperature of cooling water, amount of fuel in the fuel tank, remaining battery capacity, various warning lights, (so called tell-tales, turn indicators, and shift position indicator on the display unit 10 while preventing a further increase in temperature of the controller 20. Reducing the amount of heat generated in the controller 20 can reduce the temperature of the controller 20 to lower than the first value.

After reducing the amount of processing of the controller 20, the controller 20 checks the power state of the vehicle display device 1 (S6). If the power state of the vehicle display device 1 is off, the controller 20 stops its operation. On the other hand, if the power state of is on, the controller 20 measures the temperature of the controller 20 by using the temperature sensor SR2 again (S1) and determines, based on the acquired temperature data, whether the temperature of the controller 20 is equal to or higher than the predetermined first value (S2). If the temperature is lower than the first value, the controller 20 determines whether the amount of processing of the controller 20 is reduced (S7). If the amount of processing of the controller 20 is reduced, the controller 20 recovers the reduced amount of processing (S8). If the temperature of the controller 20 is equal to or higher than the first value, the controller 20 repeats the processes from S3 to S6. The controller 20 may display the user notification only once at the first time during the continuous operating period of the vehicle display device 1 or may display the user notification regularly at predetermined intervals. The amount of processing of the controller 20 may be reduced in accordance with the hysteresis of the displayed content on the display unit 10. In other words, the controller 20 may prevent frequent changes, which may occur in accordance with the change in temperature of the controller 20, of the displayed content on the display unit 10 within a short time. For example, if the temperature of the controller 20 temporarily drops below the first value, the controller 20 may continue to operate at a lower processing level for a predetermined time.

The vehicle display device 1 according to the embodiment is controlled in accordance with the control method described above. The controller 20 may eliminate the process of determining the state of the cooling unit 30 from the method of controlling the vehicle display device 1 according to the embodiment. In other words, the controller 20 may reduce the amount of processing of the controller 20 and generate the image data relating to the driving state without determining the state of the cooling unit 30, when the temperature of the controller 20 is equal to or higher than the first value.

When the temperature of the controller 20 is equal to or higher than the first value, the controller 20 restricts the processing relating to the multimedia devices 40 as illustrated in FIG. 4. The controller 20 restricts, for example, the processing of the controller 20 relating to the multimedia devices 40 by stopping at least one of the audio device 41, the image-capture device 42, and the sound input device 43. While restricting the processing, the controller 20 displays, for example, a notification such as "operations of the multimedia devices have been restricted" on the first display area AR1 or the second display area AR2. By displaying such a message, the controller 20 informs the passengers of the restricted operations of the multimedia devices 40. In the present embodiment, the controller 20 controls the head-up display device 12 to display the notification "operations of the multimedia devices have been restricted" on the second display region AR2.

In some embodiments, for example, a center display 44 (see FIG. 5) is mounted on the vehicle as one of the multimedia devices 40. In this case, as illustrated in FIG. 5, the controller 20 may control the center display 44 to display the notification "operations of the multimedia devices have been restricted" on a third display area AR3 of the center display 44. Processing such as displaying a notification on the center display 44 is performed on the second operating system 24b. For example, the controller 20 runs the second drawing application 25b to display a notification on the center display 44.

As described above, the vehicle display device 1 according to the embodiment includes the display unit 10 configured to display at least an image relating to a driving state of the vehicle, the controller 20 configured to generate image data of an image to be displayed on the display unit 10, and the temperature sensor SR2 configured to measure a temperature of the controller 20. The controller 20 has a function of performing first processing that is processing other than generating the image data relating to the driving state. When the temperature of the controller 20 is equal to or higher than a predetermined first value, the controller 20 generates the image data relating to the driving state while reducing the amount of first processing performed by the controller 20.

The controller 20 of the vehicle display device 1 according to the present embodiment generates image data relating to the driving state while reducing the amount of first processing performed by the controller 20 when the temperature of the controller 20 is equal to or higher than the predetermined first value. Reducing the amount of first processing performed by the controller 20 reduces an amount of heat generated in the controller 20. In this regard, the controller 20 can generate the image data relating to the driving state while preventing a further increase in temperature of the controller 20. The controller 20, for example, performs processing of displaying important indicators such as the vehicle speed, output revolutions, total drive distance, temperature of cooling water, amount of fuel in the fuel tank, remaining battery capacity, various warning lights, (so called tell-tales), turn indicators, and shift position indicator. In other words, when the temperature of the controller 20 is equal to or higher than the predetermined first value, the controller 20 reduces the amount of processing other than the processing having a higher degree of priority and displays an image relating to the driving state. The vehicle display device 1 according to the present embodiment can prevent a further increase in temperature of the controller 20 when the temperature of the controller 20 reaches or exceeds the predetermined first value and display an image relating to the driving state. Reducing the amount of processing performed by the controller 20 reduces the amount of heat generated in the controller 20. Accordingly, a temperature drop in the controller 20 can be expected.

The first processing performed in the vehicle display device 1 according to the embodiment includes processing relating to the multimedia devices 40 mounted on the vehicle. When the temperature of the controller 20 is equal to or higher than the first value, the controller 20 restricts the processing relating to the multimedia devices 40.

Restricting the processing less important, in terms of driving the vehicle, than displaying an image relating to the driving state, or restricting the processing relating to the multimedia devices 40 mounted on the vehicle, allows the controller 20 to display an image relating to the driving state in accordance with an increase in temperature of the controller 20.

The vehicle display device 1 according to the embodiment includes the display unit 10 configured to display an image at least relating to a driving state of the vehicle, the controller 20 configured to generate image data of an image to be displayed on the display unit 10, and the temperature sensor SR2 configured to measure the temperature of the controller 20. When the temperature of the controller 20 is equal to or higher than a predetermined first value, the controller 20 reduces the amount of processing of the controller 20.

The controller 20 of the vehicle display device 1 according to the embodiment generates the image data relating to the driving state while reducing the amount of processing of the controller 20 when the temperature of the controller 20 reaches or exceeds a predetermined first value. This configuration enables the vehicle display device 1 to display an image relating to the driving state while preventing a further increase in temperature of the controller 20. Reducing the amount of processing performed by the controller 20 reduces the amount of heat generated in the controller 20. Accordingly, a temperature drop in the controller 20 can be expected.

In the embodiment above, the first value is described as the highest value of the normal operating temperatures of the controller 20, but is not limited to this. For example, the first value may be a value in a range of the normal operating temperatures of the controller 20.

First Modification of Embodiment

Figure 6:
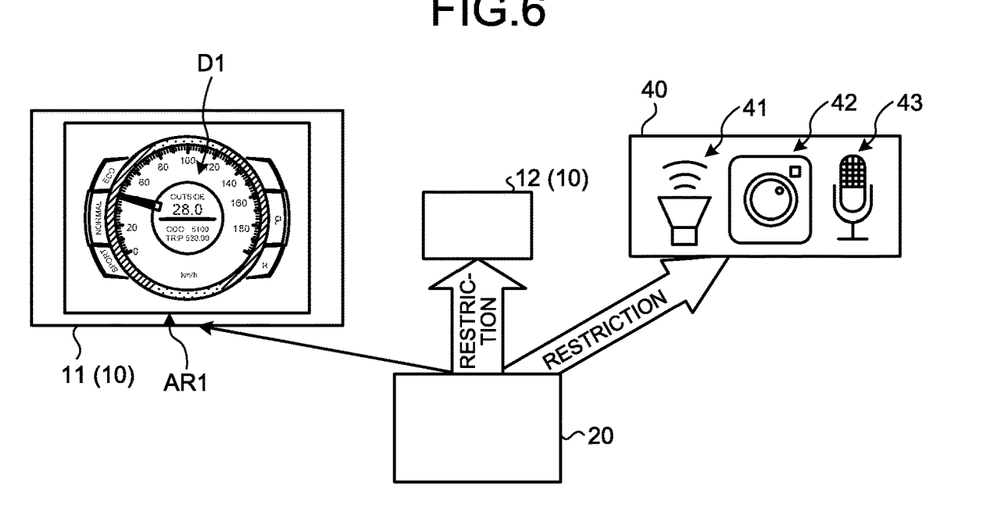
FIG. 6 is a conceptual diagram illustrating an operation of a controller according to a first modification of the embodiment.

A first modification of the embodiment will be described with reference to FIG. 6. The first modification of the embodiment relates to a vehicle display device. FIG. 6 is a conceptual diagram illustrating an operation of a controller according to the first modification of the embodiment.

The vehicle display device 1 according to the first modification differs from the vehicle display device 1 according to the embodiment in that the controller 20 restricts generation of image data different from the image data relating to the driving state when the temperature of the controller 20 is equal to or higher than a predetermined first value. The other configurations are the same as those described in the embodiment above.

When the temperature of the controller 20 is lower than the first value, the controller 20 displays an image such as an entertainment video that is different from the image data relating to the driving state on the display unit 10 or on the center display 44 (see FIG. 5). In this case, the controller 20 runs the second drawing application 25*b* and the processor 21 generates image data of the entertainment video that is different from the image data relating to the driving state. The controller 20 also controls the multimedia devices 40. The controller 20 runs, for example, the second audio application 25*d* and causes the audio device 41 to output sound corresponding to the entertainment video.

When the temperature of the controller 20 is equal to or higher than the predetermined first value, the controller 20 restricts generation of image data different from the image data relating to the driving state as illustrated in FIG. 6. In the first modification, the controller 20 stops displaying an image on the head-up display device 12. Restricting the generation of image data different from the image data relating to the driving state by the controller 20 reduces the amount of processing of the controller 20. On the other hand, the meter unit 11 displays an image D1 relating to the driving state. The controller 20 according to the first modification continues to control the multimedia devices 40 as indicated by arrow in FIG. 6. For example, the controller 20 may cause the audio device 41 to stop outputting sound corresponding to the entertainment video and output music selected by a passenger.

In the first modification, to restrict the generation of image data different from the image data relating to the driving state, the controller 20 may simplify the mode of displaying an image other than the image relating to the driving state. The mode of displaying an image is simplified by, for example, reducing the number of pixels or colors of the image, simplifying the form or movement of the image, or reducing the frame rate.

As described above, the first processing of the vehicle display device 1 according to the first modification includes generation of image data different from the image data relating to the driving state. When the temperature of the controller 20 is equal to or higher than the first value, the controller 20 restricts the generation of image data different from the image data relating to the driving state.

According to the first modification, restricting the generation of an image that is less important, in terms of driving a vehicle, than the image relating to the driving state can prevent further generation of heat in the controller 20. Thus, the controller 20 can prevent a further increase in temperature of the controller 20 when the temperature of the controller 20 reaches or exceeds the first value and display an image relating to the driving state.

Restricting the generation of image data of, for example, an entertainment video, which is relatively processing-intensive in the controller 20, can effectively reduce the amount of heat generated in the controller 20.

Second Modification of Embodiment

Figure 7:
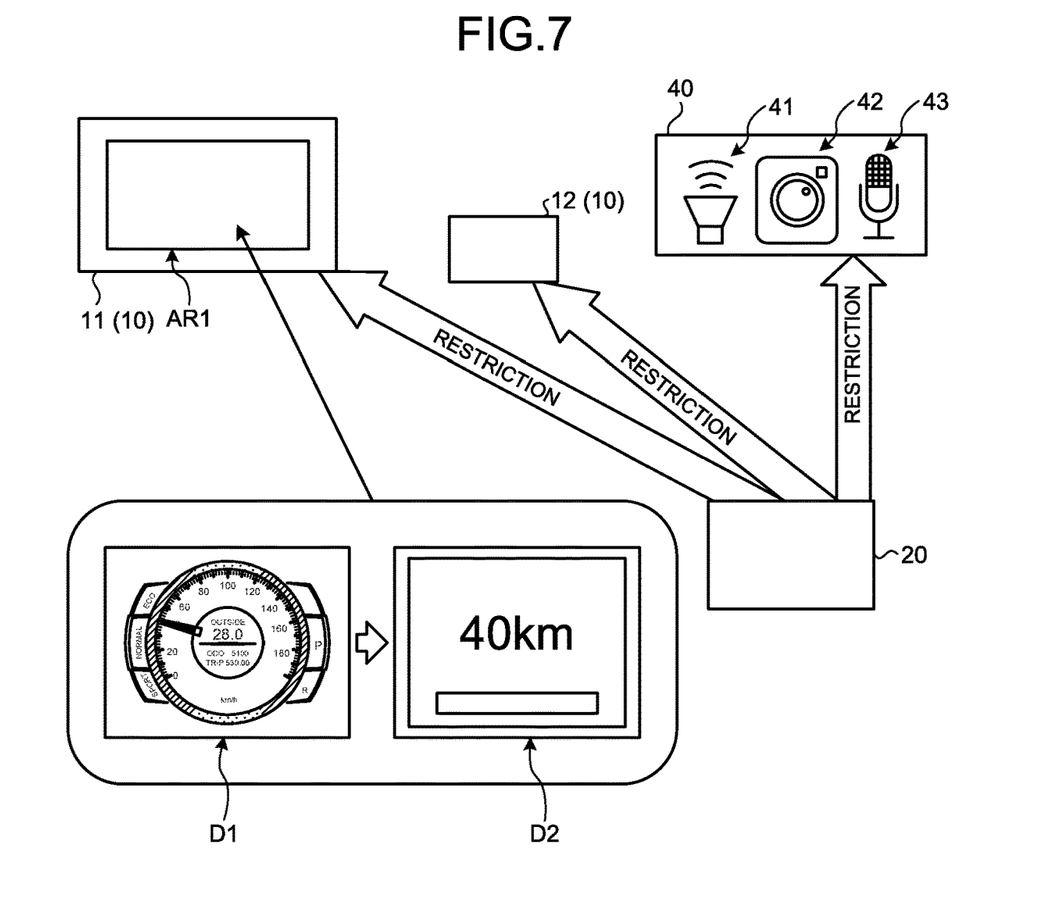
FIG. 7 is a conceptual diagram illustrating an operation of a controller according to a second modification of the embodiment.

A second modification of the embodiment will be described with reference to FIG. 7. The second modification of the embodiment relates to a vehicle display device. FIG. 7 is a conceptual diagram illustrating an operation of a controller according to the second modification of the embodiment.

The vehicle display device 1 according to the second modification differs from the vehicle display device 1 according to the embodiment in that the controller 20 simplifies the mode of displaying an image relating to the driving state when the temperature of the controller 20 is equal to or higher than the first value to further reduce the amount of processing of the controller 20. The other configurations are the same as those described in the embodiment above.

When the temperature of the controller 20 is lower than the first value, the controller 20 displays an image D1 relating to the driving state as illustrated in FIG. 7. The image D1 is an image representing an instrumental panel of a vehicle. The image D1 illustrates a pointer moving in accordance with the speed of the vehicle and indicators that vary in accordance with the driving mode or shift position of the vehicle. The controller 20 acquires, for example, the driving speed, the driving mode, and the shift position of the vehicle and the processor 21 performs real-time data processing to display the image D1. The image D1 may include an image component representing a tachometer having a pointer moving in accordance with the revolution rate of the engine of the vehicle.

When the temperature of the controller 20 is equal to or higher than the first value, the controller 20 simplifies the mode of displaying the image D1 in addition to reducing the amount of first processing performed by the controller 20. Simplifying the mode of displaying the image D1 further reduces the amount of processing of the controller 20 and the controller 20 displays an image D2. The image D2 is displayed based on image data generated with a smaller amount of processing of the controller 20 than that of the controller 20 in generating the image data of the image D1. The image D2 is, for example, an image of a value relating to the driving state simply represented by numbers or a bar chart. To simplify the mode of displaying the image D1, for example, the controller 20 reduces the number of pixels or colors of the image, simplifies the form or movement of the image, or reduces the frame rate.

When the controller 20 displays an image relating to the driving state on the meter unit 11, the controller 20 may reduce the luminance of a backlight of the meter unit 11. Reducing the luminance can reduce the amount of heat generated by the backlight, which is the main source of heat in the meter unit 11. This configuration can prevent a further increase in temperature of the controller 20 disposed in the meter unit 11.

The controller 20 may reduce the amount of processing of the controller 20 by restricting the functions of the peripheral devices such as ambient lighting or a motor driver provided in the meter unit 11.

In the second modification, the controller 20 may reduce the amount of processing in a step-by-step manner. For example, the controller 20 reduces the amount of processing step by step in the following manner. First, when the temperature of the controller 20 reaches or exceeds the first value, the controller 20 restricts the generation of image data different from the image data relating to the driving state. If the temperature of the controller 20 further increases, the controller 20 then restricts the processing relating to the multimedia devices 40. If the temperature of the controller 20 increases much further, the controller 20 then simplifies the mode of displaying the image relating to the driving state. The controller 20 may reduce the amount of processing step by step as described above. The controller 20, for example, may perform the processes of restricting the generation of image data different from the image data relating to the driving state, restricting the processing relating to the multimedia devices 40, and simplifying the mode of displaying an image relating to the driving state in any order. The controller 20, for example, may perform these processes in the descending order of the amount of processing that can be reduced by the respective process. The controller 20, for example, may select two from the processes of restricting the generation of image data different from the image data relating to the driving state, restricting the processing relating to the multimedia devices 40, and simplifying the mode of displaying an image relating to the driving state and perform the two processes one by one.

In the second modification, the controller 20 may select the process for reducing the amount of processing of the controller 20 depending on the temperature of the controller 20. To reduce the amount of processing of the controller 20, for example, the controller 20 may select at least one of the processes of restricting the generation of image data different from the image data relating to the driving state, restricting the processing relating to the multimedia devices 40, and simplifying the mode of displaying an image relating to the driving state depending on the temperature of the controller 20. For example, if the temperature of the controller 20 suddenly increases to a high temperature, the controller 20 may perform all the processes of restricting the generation of image data different from the image data relating to the driving state, restricting the processing relating to the multimedia devices 40, and simplifying the mode of displaying an image relating to the driving state.

As described above, the controller 20 of the vehicle display device 1 according to the second modification further reduces the amount of processing of the controller 20 by simplifying the mode of displaying the image relating to the driving state.

In the second modification, the controller 20 reduces the amount of processing by simplifying the mode of displaying an image relating to the driving state. This configuration prevents a further increase in temperature of the controller 20 and enables the controller 20 to display an image relating to the driving state that is an important image for the driver to drive a vehicle, when the temperature of the controller 20 increases to a high temperature.

Components described in the embodiment and the first and second modifications above may be combined as appropriate to implement the present invention.

The vehicle display device according to the present embodiment generates image data relating to a driving state of the vehicle while reduces the amount of first processing performed by the controller when the temperature of the controller is equal to or higher than a predetermined first value. The vehicle display device according to the present invention can display an image relating to the driving state while preventing a further increase in temperature of the controller.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a display unit having a meter unit and a head-up display device, the display unit configured to display a first image relating to a driving state of a vehicle on at least one of the meter unit and the head-up display device, and to display a second image different from the first image on at least one of the meter unit and the head-up display device;
a controller that is one electronic control unit provided in the meter unit, the controller configured to generate image data of an image to be displayed on the meter unit and the head-up display device; and
a temperature sensor configured to measure a temperature of the controller,
wherein the controller has a function of performing a processing that is generating first image data relating to the driving state on an first operating system, and a function of performing a first processing that is a processing other than generating the first image data on a second operating system,
the first processing includes generating a second image data different from the first image data relating to the driving state and controlling of a multimedia device which is another equipment mounted on the vehicle as a device separate from the display unit,
when the temperature of the controller is equal to or higher than a first value, the controller generates the first image data on the first operating system while reducing an amount of the first processing performed on the second operating system, and
the reducing the amount of the first processing includes at least a processing relating to the multimedia device.

2. The vehicle display device according to claim 1, wherein
when the temperature of the controller is equal to or higher than the first value, the controller restricts the generation of the second image data different from the first image data relating to the driving state.

3. The vehicle display device according to claim 1, wherein when the temperature of the controller is equal to or higher than the first value, the controller simplifies a mode of displaying the image relating to the driving state to further reduce an amount of processing performed by the controller.

4. The vehicle display device according to claim 2, wherein when the temperature of the controller is equal to or higher than the first value, the controller simplifies a mode of displaying the image relating to the driving state to further reduce an amount of processing performed by the controller.

* * * * *